United States Patent
Lichtermann et al.

(10) Patent No.: US 6,826,295 B2
(45) Date of Patent: Nov. 30, 2004

(54) METHOD AND APPARATUS FOR DETERMINING REFERENCE POINTS IN A FINGERPRINT

(75) Inventors: Jan Lichtermann, Vaihingen-Ensingen (DE); Mario Kroeninger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 661 days.

(21) Appl. No.: 09/873,570

(22) Filed: Jun. 4, 2001

(65) Prior Publication Data

US 2002/0034322 A1 Mar. 21, 2002

(30) Foreign Application Priority Data

Jun. 3, 2000 (DE) .......................................... 100 27 657

(51) Int. Cl.$^7$ ................................................. G06K 9/00
(52) U.S. Cl. ...................... 382/124; 382/125; 382/218; 382/260; 382/280; 382/291
(58) Field of Search ................................ 382/124, 125, 382/260, 263, 264, 204, 280, 218, 291; 340/5.83; 356/71

(56) References Cited

U.S. PATENT DOCUMENTS 5,926,555 A      7/1999    Ort et al.
6,285,780 B1 * 9/2001    Yamakita et al. ........... 382/110
6,636,621 B2 * 10/2003    Thebaud ..................... 382/124

* cited by examiner

*Primary Examiner*—Bhavesh M. Mehta
*Assistant Examiner*—John Strege
(74) *Attorney, Agent, or Firm*—Kenyon & Kenyon

(57) ABSTRACT

A method for determining reference points in a fingerprint image is used for determining similarity values using a determination of orientation patterns and a comparison with reference orientation patterns, in which the similarity values are compared with a first threshold value to determine whether a reference point is identified or not. Whorl, delta or core points are identified as core points. Both a linear and a nonlinear reference orientation pattern are used for core points. The orientation pattern for an image area is converted into a vector field for comparison with the reference orientation patterns. A scattering is computed from the spectral power density, which is determined for computation of orientation patterns, and severely distorted image areas are thereby eliminated from the determination of reference points.

20 Claims, 3 Drawing Sheets

METHOD AND APPARATUS FOR DETERMINING REFERENCE POINTS IN A FINGERPRINT

FIELD OF THE INVENTION

The present invention relates to a method for determining reference points in a fingerprint.

BACKGROUND INFORMATION

A method for generating a digital gray-scale image of a fingerprint for analyzing the minute details is discussed in U.S. Pat. No. 5,926,555. The minute details are determined using a signal-matched filter. Also, reference points such as core points or delta points are determined here. The digital gray-scale image is transformed into the frequency range, and is rid of distortions using a lowpass filter, a contrast-enhancing filter, or a bandpass filter. The fingerprint is analyzed in image areas of the gray-scale image.

SUMMARY OF THE INVENTION

It is believed that an exemplary method for determining reference points in a fingerprint according to the present invention may have the advantage of attaining increased reliability in determining reference points, i.e., singularities, in fingerprints. In this way, it is believed that there is significantly greater reproducibility in determining the reference points and in the fingerprint analysis as such.

Additionally, it is believed that the exemplary method and/or exemplary embodiment according to the present invention provides for placement of the fingers on the fingerprint sensor to be unimportant for analysis of singularities, as long as these singularities are still on the fingerprint image. This is achieved by determining a global orientation of finger pressure after determination of the singularities. In this way, determination can be made in what direction the finger is placed on the fingerprint sensor. This is achieved by determining the position of identified reference points with respect to each other. Additionally, the exemplary method and/or exemplary embodiment according to the present invention provides for concluding that a singularity exists on the finger, even if this singularity is not contained in the fingerprint because the finger was not entirely placed on the fingerprint sensor.

It is believed that another advantage is that the exemplary method and/or exemplary embodiment according to the present invention may achieve a better analysis of the dermal ridge patterns. An exact point analysis is done which results in no fusion of assessed values for orientation. Thus, the spatial resolution of the exemplary method and/or exemplary embodiment according to the present invention may be increased.

It is also believed that "precise" continuous orientation assessment provides for an unambiguous determination of reference points (spatial resolution), which may also be advantageous in regard to placement of the finger on the fingerprint sensor. But in this regard, it is believed to be at least important that a two-dimensional comparison be made of orientation values with stored reference orientation patterns.

Because image distortions are eliminated, it is believed that the exemplary method and/or exemplary embodiment according to the present invention may be particularly robust vis-a-vis such distortions. It is believed that using the exemplary method and/or exemplary embodiment according to the present invention provides for identifying the arch type as a reference point, which has no singularity per se. Determination of reference points makes it possible to fix global coordinate systems, independent of minute details, for description of local features. This should considerably facilitate or at least facilitate identification of a fingerprint, and thus of a person. Also, for correlation of stored fingerprints with new fingerprints, unambiguous determination of the areas to be correlated via the exemplary method and/or exemplary embodiment according to the present invention is believed to be provided, so that correlation is also improved. A global rotation angle is believed to provide for correlation of fingerprints rotated with respect to each other.

Also, via similarity values which are computed in comparing the orientation patterns with reference orientation patterns, it may be assessed whether a reference point is found or not. In this regard, its "very precise" position may be identifiable in particular.

Furthermore, via determination of reference points, whorl, delta and core points are identifiable. These are points that occur in a fingerprint as singularities.

Furthermore, in determining core points, a two-step process is used, with a linear reference orientation pattern in the first one and with a nonlinear reference orientation pattern in the second one. Thus, greater precision may be achieved.

For computing similarity values, the determined orientation patterns may be converted into a vector field, which should simplify determination of similarity values.

Determining the scattering of spectral power density in the usable frequency range provides for "stating" a coherence value, which allows image areas severely impaired by distortions to be eliminated from the analysis. This should increase the reliability of the exemplary method and/or exemplary embodiment according to the present invention, and thus the reproducibility of the analysis to be carried out.

Furthermore, the limit frequencies of the bandpass may be pre-set by the minimum and maximum dermal ridge interval, so that no usable data is filtered out of the image area.

Finally, an exemplary device is provided for determining reference points to carry out the exemplary method according to the present invention. This is, for example, a fingerprint sensor with an attached computer that carries out the analysis.

DETAILED DESCRIPTION

Figure 1:
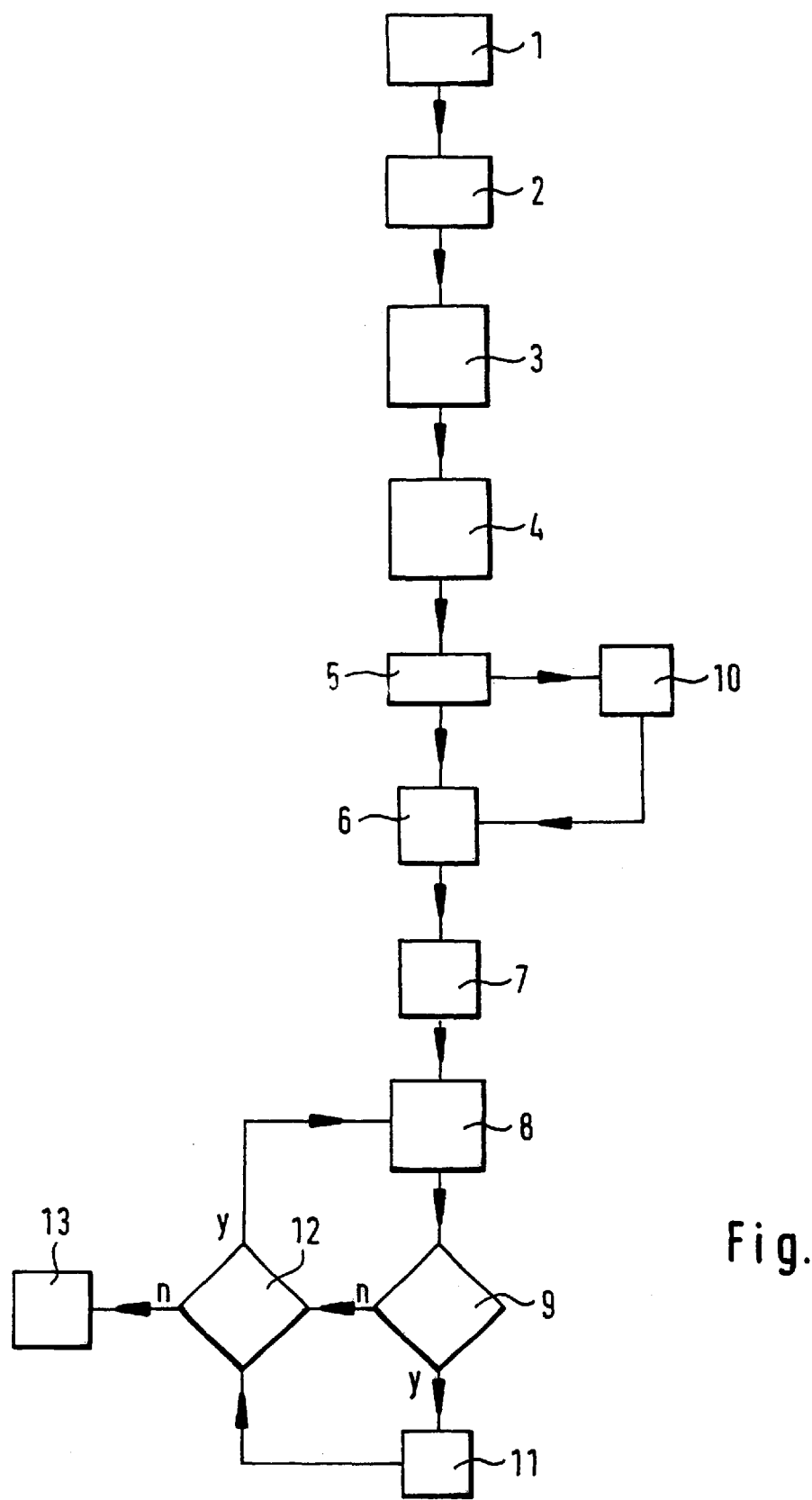
FIG. 1 shows a flow chart of the exemplary method according to the present invention.

Fingerprint sensors, and an analysis associated with fingerprint sensors, may be used in personal identification. This is because a person's fingerprint is unique. Along with police identification of persons, access systems are used which should ensure unambiguous personal identification for security reasons. Such access systems may be used for motor vehicles, buildings, or interior spaces.

In fingerprints, local and global features are distinguished. In particular, local features are distinguished via the individual dermal ridges. Dermal ridges are features such as the skin grooves on the inner surface of the hand. The local features of dermal ridges are designated as minute details. These minute details are either branchings or ends of dermal ridges.

In contrast, global features are characterized by the ridge orientation or ridge curvature. In particular, global features are characterized by so-called singularities, which are also designated hereinafter as reference points. But here, reference points are also the arch type and orientations that permit us to conclude that a singularity exists, but are not found in the fingerprint. These singularities include core points, which are local curvature maxima, delta points, which are branchings of the global line progression, and also whorl points, with the whorl points being emulatable via two core points. It is believed that singularities have the advantage of being detectable even when image quality is "poor". It is believed that this may be because the position of singularities is determined primarily or at least in part by the orientation pattern of the finger. This can be determined even with poor imprints. Thus, they may result in high-reliability analysis of a fingerprint.

Therefore, an exemplary method according to the present invention is used for determining reference points in a fingerprint that essentially has two procedural steps. First, orientation patterns of dermal ridges are carried out, and, secondly, building on that, comparisons are performed of orientation patterns with stored reference orientation patterns. Using these comparisons, singularity values are computed at many grid points of a fingerprint, which can be compared with a first threshold value. Around the grid point, which is a pixel, a number of additional adjoining pixels are needed to determine the orientation for the grid point.

If the similarity value for a comparison of a determined orientation pattern with a reference orientation pattern is above the first threshold value, then the reference point which belongs to this reference orientation pattern counts as being identified, i.e., a delta point, or a core point, or a whorl point. If no singularity should be present in a fingerprint, and no point exceeds this first threshold value, a search can be made for a maximum. This maximum does not constitute a singularity, but from its position, one can roughly conclude where the singularity would lie. This yields valuable information regarding the position of the fingerprint. Also, the arch type, which itself does not constitute a singularity, may be identified because of the comparison of the orientations with reference orientation patterns.

Determination of core points may be made more exact by a two-stage method in which initially the orientation pattern for an image area is compared with a linear reference orientation pattern, and then with a nonlinear orientation pattern. By conversion of the transmitted orientation patterns into vector fields, it is believed that comparison with reference orientation patterns is facilitated.

Prior to the search for singularities, a coherence value for a particular image area is computed using a spectral power density, which yields the scattering of spectral power density for this image area. If the coherence value is above a second threshold value, then this image area is no longer used for further analysis of reference points, since in this case there is a very severe image distortion. The upper and lower limit frequencies of the bandpass, with which the image frequencies are filtered, are each produced from the minimum and maximum dermal ridge intervals.

FIG. 1 shows the exemplary method according to the present invention as a flow chart. In step 1, using a fingerprint sensor, a fingerprint image is generated as a gray-scale image. For this purpose, the fingerprint sensor has appropriate sensors. If necessary, the gray-scale image is subjected to contrast enhancement. The gray-scale image is divided into image areas, so that the steps which follow are carried out on individual image areas. Here, a fingerprint sensor resolution of 500 dpi (dots per inch) is used. An image area includes 32×32 pixels. An image area can include more or fewer pixels.

In step 2, the gray-scale image, the information of which is found in a local area, is converted by regions into a frequency range via transformation. This transformation is carried out by a two-dimensional Fourier transform, which may advantageously be a Fast Fourier Transform.

But other transformation techniques can also be applied here. Analysis of images in a frequency range, which may be provided by various available techniques, has broad application, and facilitates image analysis and processing.

Step 3 calls for bandpass filtering of the gray-scale image by regions in the frequency range. After generation of the gray-scale image, the exemplary method and/or exemplary embodiment according to the present invention runs on a processor, which may be placed in a fingerprint sensor or which may be connected with the fingerprint sensor. The bandpass is implemented in software accordingly. The bandpass in step 3 is used to eliminate low-frequency and high-frequency image distortions. The lower limit frequency of the bandpass is obtained from the maximum dermal ridge interval that is present. That is, larger structures are identified as a distortion, and can thus be eliminated via filtering from the analysis. Structures that are smaller than the minimum dermal ridge interval undergo the same elimination. As an alternative, a bandpass may be replaced by a lowpass filter and a highpass filter connected in series, if, for example, this is easier to implement.

In step 4, the gray-scale image is subdivided into frequency and position areas. The division that was already undertaken by position is thus preserved. In the individual image areas, this division makes it possible to conduct an analysis of the dermal ridge orientation. The size of image areas is pre-set, with the size selected so that roughly two to three dermal ridges lie within one area. An exemplary image area may be 32×32 pixels. In terms of size, the image areas are chosen so that the orientation can be determined for one grid point in an image area. Several adjoining pixels around the grid point must be evaluated in order to ensure a reliable determination of orientation. Image areas may overlap, which may be the case with a large number of grid points.

In step 5, the absolute value of the usable frequency range generated by the bandpass is squared for the individual image areas in order to determine a proportional measure for the spectral power density. The spectral power density indicates for a particular frequency what power is present at this frequency. In step 6, the frequencies are weighted with the pertinent spectral power densities in the individual image areas. Thus, not only the appearance of a frequency is taken into account, but also the power that is present at that frequency. The distribution of power over the frequencies yields a curvature, for example, so that at various orientations various frequencies are present, and depending on how strongly defined an orientation is, a corresponding spectral power density is present at this frequency which represents this orientation.

In step 7, using the weighted frequencies, a straight regression line is computed. In an ideal case, a cosine function is present in the local area.

Figure 2:
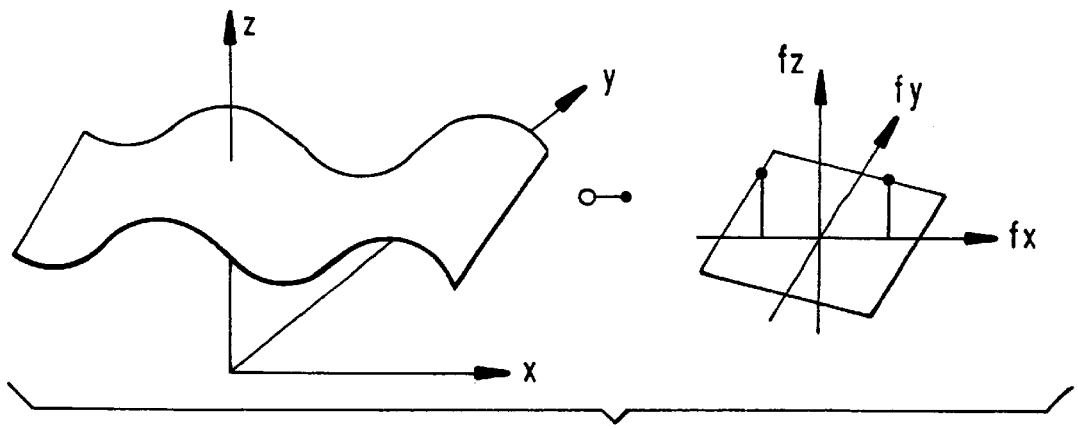
FIG. 2 shows a cosine function of frequency plotted against time.

In FIG. 2 at left, a cosine function in the local area is shown two-dimensionally. If a cosine function is transferred into the frequency range, then, in the frequency range, there are two Dirac pulses shifted by the frequency of the cosine function. We have this ideal condition if there is a distortion-free area with dermal ridges running absolutely parallel. Moreover, gray-scale changes in a fingerprint image can be modeled as sine waves corresponding to the heights and depths of dermal ridges. Therefore, a spectrum as it is shown in FIG. 2 at right, namely two Dirac pulses as a Fourier Transform of the image signal, may be expected.

Image distortions do appear. Also, owing to their curvature, fingerprints lines rarely run parallel and in a single direction. As a result, the power in a frequency range is not concentrated on just one frequency. In particular in areas with pronounced curvatures or changes in orientation, as in the vicinity of singularities, i.e., at reference points, several equal-weight Dirac pulses exist, which derive from various, mostly adjoining, orientations.

The regression line now yields an estimate for an orientation in the image area. This is computed using an inertial tensor model, in which the orientation is defined as the angle that encloses the regression line computed for the spectral power density with the x-coordinate, with a three-dimensional coordinate system present, i.e., coordinates in the x, y, and z directions. Mathematically, angle $\phi$ of the regression line is computed as follows:

$$\phi = \frac{1}{2} \cdot \arctan\frac{2 \cdot J_{xy}}{J_{yy} - J_{xx}} \text{ where}$$

$$J_{xx} = \sum_{f_x}\sum_{f_y} f_x^2 \cdot A(f_x, f_y),\ J_{yy} = \sum_{f_x}\sum_{f_y} f_y^2 \cdot A(f_x, f_y) \text{ and}$$

$$J_{xy} = \sum_{f_x}\sum_{f_y} f_x \cdot f_y \cdot A(f_x, f_y)$$

where "f" denotes the local frequencies and "A" denotes the spectral power. The local frequencies are weighted with the spectral power, so that the quantities "J" result, from which the angle $\phi$ of the regression line can then be computed.

The computation is the same as the computation of a center of gravity so that an inertial tensor model is used.

Proceeding from step 5, in which the spectral power density was computed for the usable frequency range, the scattering of the spectral power density about the regression line is computed from the spectral power density. This takes place in step 10, which is carried out simultaneously with steps 5 to 7. The computed scattering of spectral power density as a coherence value for an image area is compared with a first threshold value, in order to decide whether the image area will be used to determine the reference points. If the scattering is too great, then it is above the first threshold value, and then this image area is not used. This may be the case if there are severe image distortions.

Subsequently, in step 8, the orientations determined via the regression lines for the image areas are compared with stored reference orientation patterns. Several image areas with their orientation values are combined into one domain. The number of image areas is pre-set. Then the area is shifted over the fingerprint image in the frequency range in order to identify the reference orientation patterns.

The reference orientation patterns are generated by indicating the change in the orientation angle in one rotation about a singularity that corresponds to an angle of $2\pi$ as a function of the rotation angle. This orientation pattern is approximated by an exponential function. In the simplest case a linear approximation can also be used. However, nonlinear approximations may be considerably better at reproducing the actual orientation pattern.

To check for a domain as to whether a singularity or a reference point lies in its geometric midpoint, the properties of the orientation values in the area are compared with those of the reference orientation patterns. The essential property that is checked is the dependence of orientation values on their relative positions with respect to the area center. The orientation values around a singularity essentially only depend on the angle. To quantify the degree to which this property is relevant, the following procedure is used. First, the orientation angles at the grid points within the area are doubled. In this way, the value range is expanded from 0 to $\pi$ to 0 to $2\pi$. Thus, a vector field is obtained from the orientation field. This should facilitate the computations that follow.

Figure 3A:
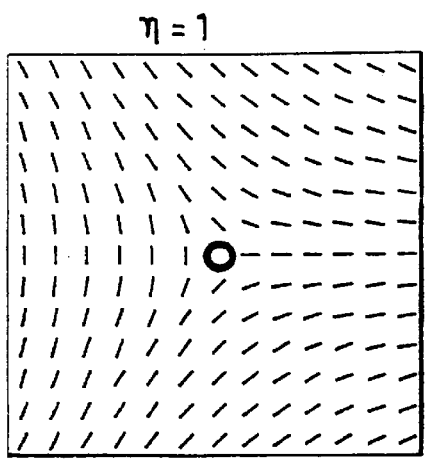
FIG. 3a shows a reference orientation pattern for a delta point with a linear approximation.
Figure 3B:
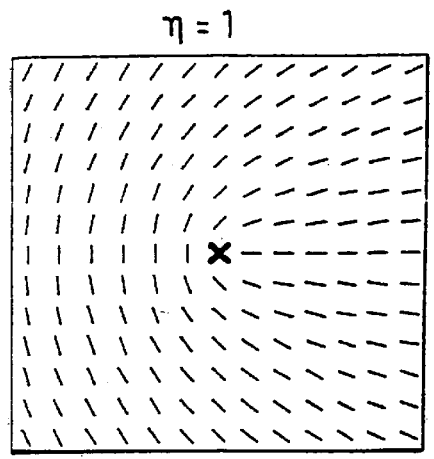
FIG. 3b shows a core point with a linear approximation.
Figure 3C:
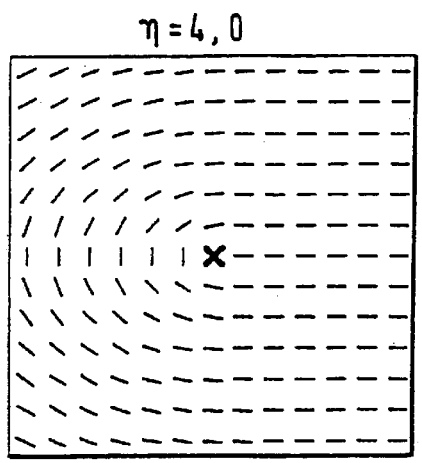
FIG. 3c shows a core point with a nonlinear approximation.

FIG. 3a shows a reference orientation pattern for a delta point with a linear approximation. FIG. 3b shows a reference orientation pattern for a core point with a linear approximation. Finally, in FIG. 3c, a core point is depicted with a nonlinear approximation. These reference orientation patterns are compared with the orientation fields.

Figure 4A:
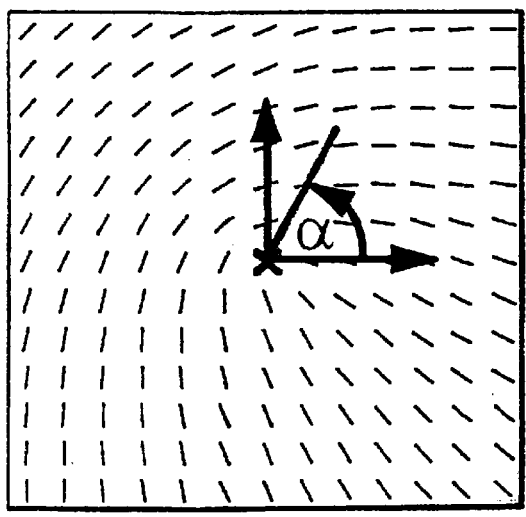
FIG. 4a shows an orientation field of a core point.
Figure 4A:
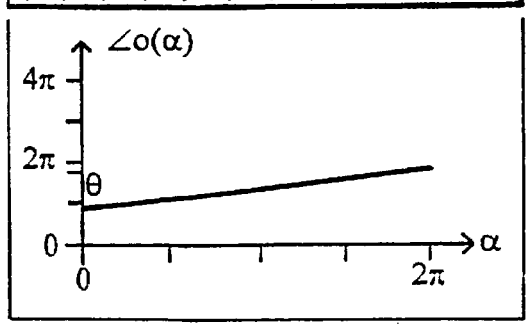
Figure 4B:
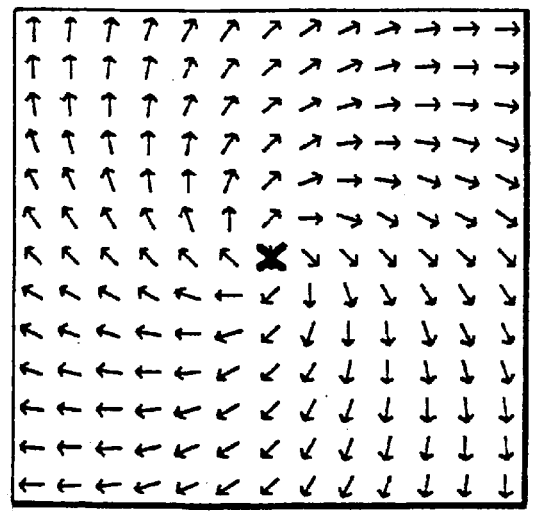
FIG. 4b shows a vector field of a core point.
Figure 4B:
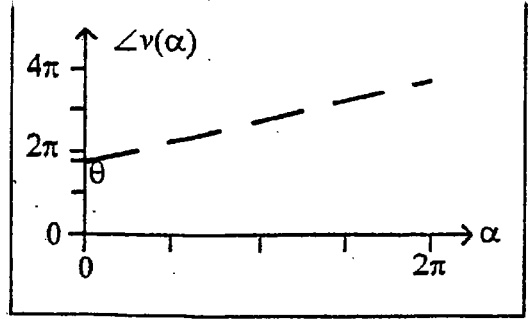

FIG. 4a shows an orientation field, and FIG. 4b shows the pertinent vector field after doubling the angles.

The angle change yielded by a revolution about the singularity in the vector field is likewise doubled by the angle doubling, and now, for example, amounts to a core point $2\pi$. If the original orientation values do in fact now only depend on the angle, then the individual vectors of the newly obtained vector value can be aligned parallel through multiplication with a suitable function. The function is produced from the inversion of the respective reference orientation pattern. For the case of a linear orientation pattern, this is shown by the following equation:

$$w_s(\alpha)=v(\alpha)\cdot m_s(\alpha)=e^{j(s(\alpha-\theta)+2\theta)}\cdot e^{-j(s-\alpha)}=e^{j(2\theta-s\theta)}$$

where $$m_s(\alpha)=e^{-j(s-\alpha)}$$

and s=1 for core points, s=−1 for delta points, "v" indicates the vector field and "m" indicates the function to align the vector field in parallel. The $\Theta$ designates the doubled angle.

After the multiplication for this case, all vectors $$\vec{w}_s(\alpha)=(Re\{w_s(\alpha)\},Im\{w_s(\alpha)\})$$

point in the same direction, which for core points coincides exactly with the orientation of the singularity. Accordingly, with the exemplary method and/or exemplary embodiment presented, not only the position but also the orientation of core points can be determined.

It is believed that the possibly parallel orientation of all vectors may work best if the singularity or reference point sought is in the middle of the area under study. The vectorial sum as a measure for the similarity between the real orientation field and the reference orientation pattern indicates the extent to which the orientation pattern and the reference orientation pattern coincide. Computation of a similarity value for an area being considered is by vectorial addition of all vectors so generated. The more vectors are oriented parallel via the multiplication, the greater will be the absolute value of the resulting sum vector. This may be the case if the corresponding singularity is in the middle of the area under study. The angle of the sum vector gives an indication of the orientation of the singularity. To do a complete search of the fingerprint for singularities or reference points, the exemplary method must be applied to the vector field of the entire fingerprint.

Therefore, in step 9, a check is made of whether a second similarity value is greater than the threshold value, so that a further identification of a reference point can be undertaken. If this is the case, then in step 11 the particular reference point, i.e., a core point, a delta point or a whorl point is identified. If this is not the case, then in step 12, a check is made as to whether there are additional regions of the overall fingerprint image which meet the criterion. If this is not the case, then in step 13, the analysis is terminated, and the results are stored. If other regions exist, then the analysis is continued in step 8. The analysis of the fingerprint is thus still incomplete.

As an alternative, if no singularity can be identified, by taking into account a maximum of all similarity values, a statement can be made of where the singularity is, somewhat, outside the fingerprint. That is, the fingerprint image has incompletely registered the fingerprint, since the finger was not correctly placed on the fingerprint sensor. At point P of the maximum, as an example, a multiple comparison of orientation values surrounding P can be carried out with several nonlinear reference orientation patterns of various curvatures, to determine an estimated curvature value for point P. From the comparison already done previously with the core reference orientation pattern, an estimated value for the orientation at point P is also available. A model is derived from the position of the maximum and from these estimated values, from which the coordinates of the core point which lies outside the fingerprint image can be estimated.

One exemplary method for this estimation is the following: if we assume that the orientation coincides with the actual core point, then the core point should lie on a straight line passing through point P and having the slope of the angle of orientation. To determine the point on the line, which is to serve as the estimated value for the unknown core point, all that is still missing is an interval d on the straight line. In this regard, we use the following consideration: the larger the curvature value at point P, the closer P lies to the actual core point. In the "simplest" case, therefore, there is a reciprocal relationship, which is derived from $$d \approx c_1 \cdot \frac{\eta_{core}}{\eta} + c_2$$

In this regard, $\eta_{core}$ is an average or frequently present core point curvature, and $c_1$ and $c_2$ are empirically determined constants. Using these values, the estimation for the core point is complete.

A fingerprint sensor has an apparatus, arrangement or structure to record the gray-scale image, a processor and a storage device to carry out the exemplary method and/or exemplary embodiment according to the present invention.

What is claimed is:

1. A method for determining reference points in a fingerprint image, the method comprising:
   generating the fingerprint as a gray-scale image;
   dividing the gray-scale image into image areas;
   converting the gray-scale image by region from a position range into a frequency range via a transformation;
   bandpass-filtering the gray-scale image by region in the frequency range for generating a usable frequency range;
   computing a spectral power density for a particular image area by squaring an absolute value of the usable frequency range in a particular image area;
   weighting frequencies in the usable frequency range in the particular image area with a particular pertinent spectral power density to provide weighted frequencies;
   computing a straight regression line using the weighted frequencies for the particular image area for determining an orientation pattern of dermal ridges in the particular image area; and
   comparing the orientation pattern with stored reference orientation patterns of a preset number of image areas forming an image area region for identifying the reference points.

2. The method of claim 1, further comprising:
   computing similarity values for the comparing of the orientation pattern with the stored reference orientation patterns; and
   comparing the similarity values with a first threshold value for identifying the reference points for the particular image area for the stored reference orientation patterns for which a particular similarity value is greater than the first threshold value.

3. The method of claim 2, wherein at least one of whorl points, delta points and core points are identified as the reference points.

4. The method of claim 3, wherein the stored reference orientation patterns include a linear reference orientation pattern and a nonlinear reference orientation pattern for determining the core points.

5. The method of claim 2, further comprising converting the orientation pattern into a vector field for the comparing with the stored reference orientation patterns.

6. The method of claim 2, wherein:
   the computing of the spectral power density of the particular image area includes computing a scattering about the straight regression line; and
   the comparing includes comparing the scattering with a second threshold value, only image areas for which the scattering is less than the second threshold value being used for determining the reference points.

7. The method of claim 1, wherein for the bandpass-filtering, an upper limit frequency and a lower limit frequency are each preset through a minimum dermal ridge interval and a maximum dermal ridge interval.

8. The method of claim 2, further comprising estimating a position of a singularity using a maximum of the similarity values if none of the similarity values is greater than the first threshold value.

9. An apparatus for determining reference points in a fingerprint image, the apparatus comprising:
   a generating arrangement for generating the fingerprint as a gray-scale image;
   a dividing arrangement for dividing the gray-scale image into image areas;
   a gray-scale image converting arrangement for converting the gray-scale image by region from a position range into a frequency range via a transformation;
   a bandpass-filtering arrangement for bandpass-filtering the gray-scale image by region in the frequency range for generating a usable frequency range;
   a spectral power density computing arrangement for computing a spectral power density for a particular image area by squaring an absolute value of the usable frequency range in a particular image area;

a weighting arrangement for weighting frequencies in the usable frequency range in the particular image area with a particular pertinent spectral power density to provide weighted frequencies;

a straight line regression computing arrangement for computing a straight regression line using the weighted frequencies for the particular image area for determining an orientation pattern of dermal ridges in the particular image area; and an orientation pattern comparing arrangement for comparing the orientation pattern with stored reference orientation patterns of a preset number of image areas forming an image area region for identifying the reference points.

10. The apparatus of claim 9, further comprising:

a similarity value computing arrangement for computing similarity values for the comparing of the orientation pattern with the stored reference orientation patterns; and a similarity value comparing arrangement for comparing the similarity values with a first threshold value for identifying the reference points for the particular image area for the stored reference orientation patterns for which a particular similarity value is greater than the first threshold value.

11. The apparatus of claim 10, wherein at least one of whorl points, delta points and core points are identified as the reference points.

12. The apparatus of claim 11, wherein the stored reference orientation patterns include a linear reference orientation pattern and a nonlinear reference orientation pattern for determining the core points.

13. The apparatus of claim 10, further comprising an orientation pattern converting arrangement for converting the orientation pattern into a vector field for the comparing with the stored reference orientation patterns.

14. The apparatus of claim 10, wherein:

the computing of the spectral power density of the particular image area includes computing a scattering about the straight regression line; and the comparing includes comparing the scattering with a second threshold value, only image areas for which the scattering is less than the second threshold value being used for determining the reference points.

15. The apparatus of claim 9, wherein for the bandpass-filtering, an upper limit frequency and a lower limit frequency are each preset through a minimum dermal ridge interval and a maximum dermal ridge interval.

16. The apparatus of claim 10, further comprising a position estimating arrangement for estimating a position of a singularity using a maximum of the similarity values if none of the similarity values is greater than the first threshold value.

17. An apparatus for determining reference points in a fingerprint image, the apparatus comprising:

means for generating the fingerprint as a gray-scale image;

means for dividing the gray-scale image into image areas;

means for converting the gray-scale image by region from a position range into a frequency range via a transformation;

means for bandpass-filtering the gray-scale image by region in the frequency range for generating a usable frequency range;

means for computing a spectral power density for a particular image area by squaring an absolute value of the usable frequency range in a particular image area;

means for weighting frequencies in the usable frequency range in the particular image area with a particular pertinent spectral power density to provide weighted frequencies;

means for computing a straight regression line using the weighted frequencies for the particular image area for determining an orientation pattern of dermal ridges in the particular image area; and means for comparing the orientation pattern with stored reference orientation patterns of a preset number of image areas forming an image area region for identifying the reference points.

18. The apparatus of claim 17, further comprising:

means for computing similarity values for the comparing of the orientation pattern with the stored reference orientation patterns; and means for comparing the similarity values with a first threshold value for identifying the reference points for the particular image area for the stored reference orientation patterns for which a particular similarity value is greater than the first threshold value.

19. The apparatus of claim 18, further comprising means for converting the orientation pattern into a vector field for the comparing with the stored reference orientation patterns.

20. The apparatus of claim 18, further comprising means for estimating a position of a singularity using a maximum of the similarity values if none of the similarity values is greater than the first threshold value.

* * * * *